United States Patent [19]

Kampf et al.

[11] 4,345,288

[45] Aug. 17, 1982

[54] SOLID STATE OVER-CURRENT PROTECTIVE APPARATUS FOR A POWER CIRCUIT

[75] Inventors: Julian C. Kampf, Grafton; Richard J. Graefe, Bayside; Mark V. Profio, Wauwatosa, all of Wis.

[73] Assignee: Square D Company, Palatine, Ill.

[21] Appl. No.: 260,545

[22] Filed: May 4, 1981

[51] Int. Cl.³ .................... H02H 7/085; H02H 7/09
[52] U.S. Cl. ........................................ 361/31; 361/85; 361/87; 361/94
[58] Field of Search .................. 361/31, 28, 29, 23, 361/94, 96, 85, 87

[56] References Cited

U.S. PATENT DOCUMENTS 3,996,499  12/1976  Gary et al. .................... 361/29 X
4,000,446  12/1976  Vandevier et al. ................ 361/31
4,054,932  10/1977  Sehmer et al. ................... 361/31
4,103,317  7/1978   Krick ........................... 361/31

OTHER PUBLICATIONS

"A New Concept in Variable Voltage-Variable Freq. Motor Prot.", Krick et al., IEEE 1979 Annual Textile Ind. Technical Conf., N. Carolina, May 2-3, 1979.

*Primary Examiner*—Reinhard J. Eisenzopf
*Attorney, Agent, or Firm*—Michael J. Femal

[57] ABSTRACT

A solid state overload relay protective apparatus for electric motors which includes not only the overload feature, but the additional features of underload and single phase protection. Small current transformers for sensing the current flow in each phase of the motor are utilized, like those found in the ground fault sensing art because a current-to-voltage converter circuit reflects a short circuit back to the secondary of the transformers. The signal from the current transformers which is proportional to the sensed current in the motor is fed through the converter, a scaling and summing amplifier adjustable for a wide range of motor full load currents, an ideal diode peak detector, a time integrator amplifier, to one input of a comparator circuit having a trip reference voltage signal at another input. The comparator provides an output signal to a transistorized trip level circuit that deenergizes a coil of an overload relay opening its contacts and interrupting power to the motor.

17 Claims, 4 Drawing Figures

SOLID STATE OVER-CURRENT PROTECTIVE APPARATUS FOR A POWER CIRCUIT

BACKGROUND OF THE INVENTION

This invention relates to a protective apparatus for a power circuit and, more particularly, to a solid state overload relay apparatus that will generate a trip signal in response to a selected set of predetermined conditions, such as an overload, underload or a loss of a phase, in the power circuit.

Typically, AC magnetic contactors and starters are electric controllers used for accelerating a motor from its rest mode to a normal operating speed. During this start-up period and during normal operating conditions, electric motors may be subject to harmful overloads, loss of a phase or excessive underload conditions. Any one of these conditions, if it persists for a predetermined time, may be harmful to the electric motor or its operation and, therefore, a solid state overload relay apparatus, which incorporates circuitry to handle one or all of the three above-mentioned conditions, would be desirous.

One such apparatus having circuitry for detecting overload currents in a motor power circuit is disclosed in U.S. Pat. No. 3,851,216, assigned to the assignee of this invention, which employs one type of discrete component circuitry for providing overload protection in power circuits of electric motors. However, the overload relay apparatus of that invention included only discrete elements to provide temperature compensation for the circuitry. Next, the overload and reset features functioned separately, rather than as an integral circuit.

Other prior art includes U.S. Pat. No. 4,246,622 Hosoda, et al and U.S. Pat. No. 4,041,540 to Kampf, et. al.

Some of the foregoing limitations found in prior art protective devices for motor power circuits pertaining to temperature compensation, overload/reset functions, and a single protective apparatus module covering the full range of motor currents for a single NEMA size starter are substantially solved by the circuitry of the present invention. In the present invention, the trip output signals from the overload detection circuit, the underload detection circuit, the single phase detection circuit and the attendant reset circuit for the protective apparatus are all summed at a common point and fed to a negative input of a comparator which acts as a Schmidt trigger to operate a pair of electromechanical relays having overload and alarm contacts, respectively.

An object of the present invention is to provide a solid state overload relay apparatus for electric motors in which the entire circuitry closely approximates a zero temperature coefficient, rather than having discrete components for the temperature compensation function.

Another object is to provide a solid state overload protective apparatus for electric motors which has several functions, such as overload, underload and single phase detection circuits and a reset circuit, all having their trip signal outputs and reset signal outputs, respectively, summed at a common point to provide an input to a two level comparator for trip and rest of the overload and alarm relays.

Still another object is to provide a solid state overload relay protective apparatus which automatically opens the overload contacts and momentarily closes the alarm contacts when a power failure in the voltage supply occurs for greater liability of the protective apparatus.

A further object is to provide a solid state overload relay protective apparatus in which a control therein includes a variable adjustment so that the entire current ranges of a single NEMA size starter can simply be dialed to achieve the motor full load current setting.

In accordance with the present invention, a solid state overload relay protective apparatus for electric motors which includes not only the overload feature but the additional features of underload and single phase protection comprises small current transformers for sensing the current flow in each phase of the motor, like those found in ground fault sensing art. The current transformers generating an output signal proportional in magnitude to the sensed current are connected to a current-to-voltage converter circuit. The output signal of the converter is then fed to a scaling and summing amplifier. The output signal of the scaling and summing amplifier is fed through an ideal diode peak detector which, in turn, provides an input signal to a time integrator amplifier. The output signal from the time integrator amplifier is fed through a diode to one input of a comparator acting as a Schmidt trigger. When the output signal of the time integrator amplifier exceeds a predetermined trip reference voltage signal at the other input of the comparator, the output state of the comparator changes to a trip level, removing the base drive from a driver transistor de-energizing the coil of the overload relay and opening its contacts. Moreover, this circuit construction of the present invention permits an underload detection circuit and a single phase detection circuit also to be connected to the negative input of the comparator so that a single phase, or underload, condition exceeding predetermined limits also will change the output state of the comparator to the trip level and, thus, remove energy from the relay coil operating the overload contacts.

BRIEF DESCRIPTION OF THE DRAWINGS

The features of the present invention which are believed to be novel and unobvious are set forth with particularity in the appended Claims. The invention itself, however, together with other objects and advantages thereof, may be best understood by reference to the following description taken in conjunction with the accompanying drawings in which:

DESCRIPTION OF THE PREFERRED EMBODIMENT

Figure 1:
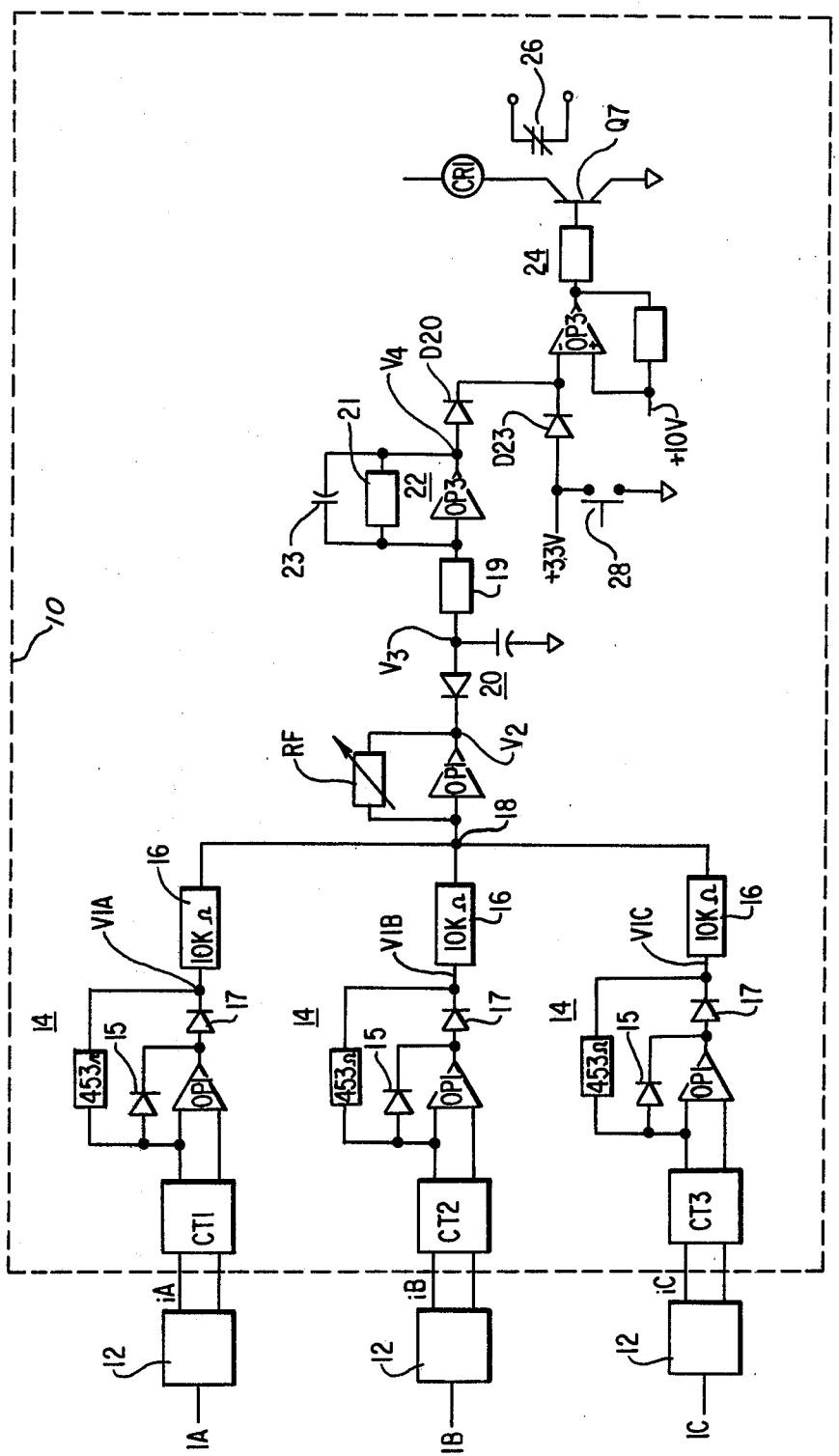
FIG. 1 is a simplified block diagram of a novel solid state overload protective apparatus of the present invention.

Referring now to FIG. 1, a solid state overload relay protective apparatus 10 is shown within the dotted lines. The inputs to the circuitry 10 are from 240-turn current transformers 12 mounted on the starter buswork. The motor current IM is comprised of input currents IA, IB and IC from a three phase network supplying power to the motor. Each current transformer 12 provides an output current proportional in magnitude to the sensed currents IA, IB and IC. These output currents, iA, iB and iC are fed through 1,000-turn current transformers in the solid state overload relay housing (only face plate shown in FIG. 4), CT1, CT2 and CT3, respectively. The outputs of CT1–CT3 are fed to three identical current-to-voltage converter circuits 14 including three operational amplifiers, each having one quarter of a quad op-amp, OP1, having a 453-ohm feedback resistor thereacross a diode 15 connected in parallel to said feedback resistor with its anode connected to the input of OP1 and a second diode 17 having its anode connected to the output of OP1. Therefore, the I-V converter transforms the motor currents IA, IB and IC into proportional output voltages, V1A, V1B and V1C.

Since the output voltages of the converter circuit are halfwave rectified by the second diode in circuit with each OP1, the output of the I-V converter (V1) is approximately equal to the following equation: $V1=(IM \times \sqrt{2} \times 453)/(240 \times 1,000)$ where IM=the RMS motor current; 240=turns ratio of large current transformers mounted on starter; 1,000=turns ratio of small current transformers on the solid state overload relay; and, 453=the feedback resistor resistance. The output voltages from operational amplifiers OP1 of the converter circuit are dropped across a 10 K-ohm input resistors 16 for each phase and the resulting voltages V1A–V1C are summed at a node 18 and scaled appropriately for each individual motor full load current setting as determined by a variable feedback resistor RF. Scaling and summing amplifier OP1, which is also a one-fourth part of quad op-amp OP1, provides an output voltage V2 to an ideal diode peak detector circuit 20. Said circuit 20 smooths out the output voltage V2 from the scaling amp and provides an output voltage signal V3, approximately 95% of the input voltage V2 from the scaling amplifier. The output voltage V3 of peak detector 20 is approximately two volts at motor full load current. This voltage level V3 provides an input through a series resistor 19 to a time integrator amplifier circuit 22 having a feedback resistor 21 and a capacitor 23 forming a timing circuit and an amplifier OP3 where V3 is further amplified. An output voltage V4 of this circuit 22 becomes an exponential response of the input voltage V3 thereto, and the output voltage V4 of this circuit is then fed via a diode D20 to a trip voltage detector circuit 24 having one input tied to a trip reference voltage of approximately 10 volts. So, when the output of the time integrating amplifier 22 reaches 10 volts, the preset trip level of the trip voltage detector 24, then the trip voltage detector 24 will change output states to a trip level and an overload relay driver Q7 will turn off thereby de-energizing relay coil CR1 opening overload relay contacts 26. When the trip reference voltage detector circuit 24 is in its trip level state, then a 3.3 volt source is connected to the negative input of circuit 24 via a diode D23 to keep it latched in the trip level state after capacitor 23 decays to a zero voltage level. A normally open reset switch 28, when actuated to close its contacts, shorts out the 3.3 volt supply. This disables the latch maintaining the trip level of circuit 24, and circuit 24 switches back to its reset level energizing Q7, closing overload contacts 26.

Figure 2:
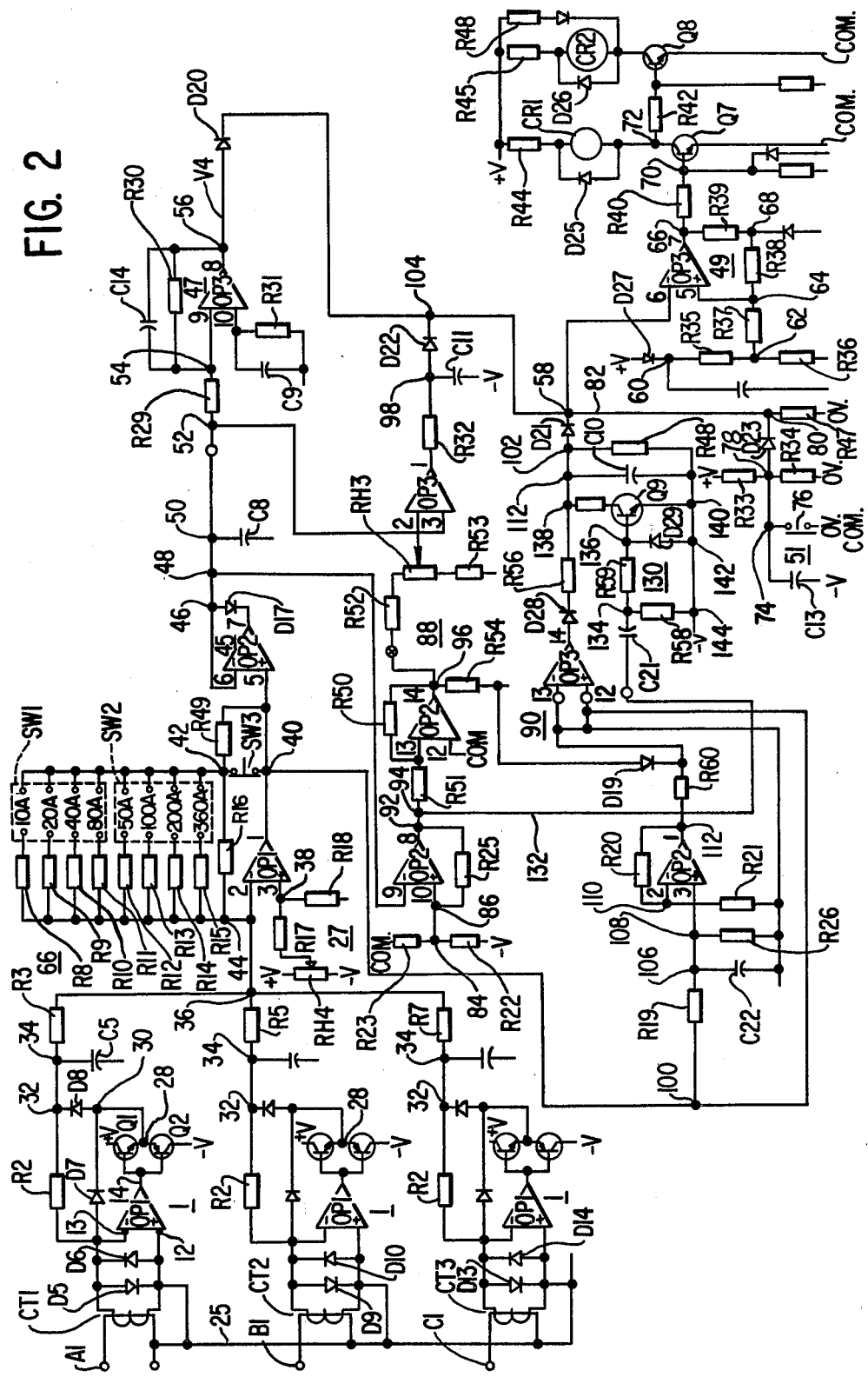
FIG. 2 shows a more detailed schematic of the circuitry of FIG. 1, including the underload and single phase circuitry.

Now a more detailed description of the solid state overload relay protective apparatus including underload and single phase voltage detection circuits will be described in greater detail as best shown in FIG. 2. The currents sensed by the large current transformers 12 on the starter for a three phase motor are fed to input terminals A1, B1, and C1 of current transformers CT1, CT2 and CT3, respectively. A common line 25 (COM) is attached to the other terminal of each current transformer CT1, CT2 and CT3. These current transformers are small toroid current transformers like those commonly used in ground fault interrupter circuit breaker equipment. These current transformers are terminated to an active load 1 defining the current-to-voltage converter which reflects a secondary short circuit and, therefore, minimizes core flux requirements. Connected across the output of the current transformers CT1, CT2 and CT3 are a pair of oppositely poled diodes D5 and D6, D9 and D10, and D13 and D14, respectively. These diodes act as a surge protection for each active load comprised of a one quarter operational amplifier OP1 previously described as a quad op-amp. Since the signal processing for each phase A1, B1, and C1 and the related circuitry thereto is identical, the description for input A1 will be described only, as its function applies to the other two inputs and their related circuitry likewise.

As previously stated, oppositely poled diodes D5 and D6 provide a surge protection to the input of operational amplifier OP1. The positive input of OP1 is tied to common at pin 12. The negative input of OP1 sees the output current of CT1 at pin 13 which is proportional to the current at terminal A1. The output of OP1 is at pin 14 which is fed to a Darlington switch configuration composed of current drivers Q1 and Q2 tied to a +V reference voltage supply and a −V reference voltage supply, respectively. The current amplifier Darlington configuration is necessary since the output of OP1 at pin 14 saturates severely at higher input currents. The output of Q1 and Q2 appears at node 28 which is, in turn, fed to a node 30. Node 30 divides into two paths, one back to pin 13 of OP1 through a diode D7 poled to block positive going signals at node 30; the other path from node 30 is fed through diode D8 poled to permit the passage of positive going pulses which, in turn, has its cathode connected to node 32. Node 32 splits into a path through a feedback resistor R2 to the pin 13 at the negative input of OP1. The other path goes to node 34 which has a capacitor C5 tied between it and common which acts as a noise filter. The other path of node 34 is through a resistor R3 of approximately 10 K-ohm to a summing junction 36. There, currents from terminals A1, B1, and C1 now converted into voltages, as seen at output resistors R3, R5 and R7, are summed at the junction 36.

Junction 36 provides an input to a pin 2 of the negative input of OP1, the fourth operational amplifier in the quad op-amp, and a positive input at pin 3 is connected to an offset potentiometer resistor network 27 at node 38 wherein a resistor R18 is between node 38 and common. A resistor R17 is connected at one end to node 38 and its other end to a potentiometer RH4 connected across the plus and minus voltage supplies. RH4 is adjusted so that a zero current input at A1, B1, C1 will provide a zero volt output at pin 1 node 40. Thus, the offset circuit network connected to node 38 serves as a nulling circuit for OP1 and the input I-V converters.

OP1 is connected to a circuit network acting as a scaling amplifier. The output of OP1 at pin 1 is connected to a node 40 which splits into three separate paths. One is through a test switch, SW3, which is normally closed to connect a feedback resistor from pin 1 to the negative input terminal at pin 2 of OP1. The feedback resistor is comprised of a fixed resistor R16 which is always in the circuit from pin 1 to pin 2, and a pair of BCD coded switches, SW1 and SW2, having variable resistor values connected in parallel with feedback resistor R16 at nodes 42 and 44. Parallel connected feedback resistors R8-R11 are in switch SW1 and parallel connected feedback resistors R12-R15 are in switch SW2. The switches SW1 and SW2, combination with R16, provide the proper selection of the feedback resistor value corresponding in weight to any motor full load current setting in increments of 10 amps from 250 amps-750 amps, ratings for electric motors typically found in a NEMA Size 7 starter power circuit.

Next, as shown in the drawings, BCD code switch SW1 includes the resistors R8-R11 in which R8, when switched in, has a weight of 10 amps, and a BCD weight of one; R9 has a weight of 20 amps and a BCD weight of two; R10 has a weight of 40 amps and a BCD weight of four; R11 has a weight of 80 amps and a BCD weight of eight. BCD switch SW2 includes the resistors R12-R15 in which R12 has a weight of 50 amps and a BCD weight of one; R13 has a weight of 100 amps and a BCD weight of two; R14 has a weight of 200 amps and a BCD weight of four; R15 has a weight of 360 amps and a BCD weight of eight. R16, which is always switched in, has a weight of 250 amps and a fixed BCD weight. Thus, the summing and scaling amplifier includes the above-mentioned resistor switching network for setting the motor full load current (MFLC) equivalent to the full range of motors in a NEMA Size 7 starter.

In parallel with the test switch SW3, is a resistance R49 which is out of the circuit during normal operation until test switch SW3 is activated, putting R49 in series with the setting of the resistor switching network in the feedback loop, resulting in a trip indication in approximately 20 seconds, to be described in greater detail later.

The output at pin 1 of OP1 summing and scaling amplifier, which is approximately a −2 volt at MFLC, is then fed to an ideal diode/peak detector 45 which is also one-fourth of quad op-amp OP2 and includes a positive input at pin 5 and a negative input at pin 6 and an output at pin 7. The output at pin 7 is connected to a diode D17 poled to pass a negative going pulse through to node 46 which splits into two paths, one providing a feedback path to the negative input at pin 6 of OP2, and the other path to a node 48.

Node 48 splits the signal and one path is to the underload circuit 88, to be described in greater detail later, whereas the other path is to a node 50 having a capacitor C8 between it and common in the circuit. The average value of the voltage from the summing and scaling amplifier OP1, as seen by the ideal diode/peak detector 45, is the average value found by integrating over one-sixth of a cycle, assuming a balanced three phase system and this, in turn, yields a 95% average value. The output of the peak detector is approximately the input voltage from the summing and scaling amplifier.

This peak detector voltage built up across capacitor C8 is then seen at the negative input at pin 9 of one-fourth quad op-amp OP3, including a positive input at pin 10 connected to a capacitor C9 and resistance R31 connected in parallel between it and the common. Capacitor C9 and resistance R31 act as a frequency and bias current compensation circuit for the input to op-amp OP3 at pin 10. An output from OP3 occurs at a pin 8. In series between the negative input at pin 9 and node 50 is a node 52, a resistance R29 and a node 54. In series with the output of OP3 at pin 8 is a node 56 which splits the output into two paths, one is the feedback path to pin 9 negative input having a capacitor C14 and resistor R30 connected in parallel to one another in the feedback path back to node 54. OP3, having pins 8, 9 and 10, acts as a time delay integrator 47 that is driven by the scaling and summing amplifier OP1 and peak detector 45 and its related components to provide inverse trip time characteristics. The output of the integrator OP3 at pin 8 will be the peak detector output voltage x the DC gain of the amplifier x the exponential function (1-e to the −t/RC power). The DC gain is equal to R30/R29, which is approximately equal to 4.5, and the resistor capacitor constant is approximately equal to 60 seconds.

Thus, at MFLC, as previously mentioned, the output voltage V4 at pin 8 of the time delay integrator will gradually build up to the neighborhood of 9½ volts. The output at pin 8 has been dropped across a diode D20 poled to accept a positive pulse and the diode drop of D20 is approximately equal to ½ volt. Therefore, a trip voltage is seen at a node 58 which splits into two conducting paths, one to an input pin 6 at the negative input of a one-fourth quad op-amp OP3 having a second positive input at pin 5 and an output at pin 7. The trip voltage detector OP3 serves as a two level comparator 49 acting like a Schmidt trigger having a non-trip output at pin 7 of 13.5 volts from turn-on of the solid state overload relay protective apparatus to normal operating current levels for the motor. The voltage at pin 5 of the comparator OP3 is approximately equal to 9.5 volts at turn-on due to its connection to a trip reference voltage set by a voltage divider network having one side connected to the positive voltage supply, a diode D27 poled in a direction to allow current to flow from the positive voltage supply through a node 60, a resistance R35 connected in series to the voltage supply, a node 62 and a resistance R36 in series with R35 connected to node 62 on one side and common on its other side. Node 62 is connected to pin 5 through a resistor R37 and a node 64. The trip output signal at pin 7 is connected to a node 66 which splits the trip output signal into two paths, one through a resistor R39 and a node 68 through R38 to node 64 back to positive input at pin 5. The other path is through a resistor R40 to a node 70 connected to the base of an overload relay driver Q7 having its collector connected in series with a relay coil CR1 and resistance R44 to a positive voltage unregulated supply. The relay coil CR1 has a free-wheeling diode D25 connected thereacross and poled in a manner to protect the coil when Q7 is suddenly turned off when comparator OP3 senses a trip signal and changes its output signal state from a +13.5 volts to a −15 volts. The emitter of Q7 is connected to common. In series between the collector of Q7 and the coil CR1 is a node 72 having a resistor R42 connected in series to the base of an alarm contact driver Q8. When Q7 is turned off, a sufficient current flows through R44 and coil CR1 to node 72 and through resistor 42 to the base of Q8 to turn it on causing a relay coil CR2 connected to the collector of driver Q8 to be energized through the resistor R45 connected to the positive voltage unregulated supply. The emitter of Q8 is connected to common. In addition, CR2 includes a free-wheeling diode D26 to protect the coil as previously described for CR1. Parallel with R45 and CR2 is a resistance R48 in series with a light emitting diode which gives a visual indication that the overload has tripped out the circuit, and CR2 can operate alarm contacts to give an audio indication of the same.

Turning now to a reset circuit 51 which includes the −V regulated voltage supply connected to one side of a capacitor C13 which, in turn, is connected to a node 74 splitting into two paths, one path having a reset switch 76 connecting node 74 to common, the other path goes to a node 78 connected on one side through resistor R33 to the +V regulated voltage supply and, on the other side, through resistor R34 to common. This node 78 is connected through a diode D23 to node, having one side connected through a resistor R47 to the common and the other side through a conductor 82 to node 58.

To explain the operation of this reset circuit 51, the output signal, as previously stated, of the trip reference comparator amplifier OP3 is normally 13.5 volts at pin 7 which, in turn, causes driver Q7 to be turned on and relay CR1 to be energized. This, of course, closes the overload contacts. The relay CR1 is only energized when power is applied to the solid state overload relay protective apparatus. The output of this amplifier OP3 at pin 7 is fed back to the positive input through resistors R39 and R38 which establishes a reference voltage of approximately 9.54 volts. When the negative input voltage of pin 6 exceeds this 9.5 volt level, the amplifier OP3 will switch in a manner similar to a Schmidt trigger and change to a trip level. When the output voltage at pin 7 changes, it changes from a +13.5 volts to a −15 volts causing the turn-off of driver Q7 and de-energizing relay CR1. The feedback to the positive input of OP3 at pin 5 will then change to a reference reset voltage level of approximately 0.67 volts. The reset circuit, as previously described, provides approximately a constant +3.5 volt level output through diode D23, node 80 and node 58 to the negative input at pin 6 of OP3. This means that, because of the Schmidt trigger action of this circuit, once the overload condition occurs, the reset circuit, as previously described, keeps the solid state overload relay circuit in the tripped state until the reset switch 76 is depressed and the capacitor C14 of the time integrator OP3 has discharged below the 1.3 volt level (0.67+diode drop D20). By use of this two-level comparator/trip voltage detector for trip and reset of the overload relay, the circuitry utilizes the feedback capacitor C14 in the time delay integrator for both trip and reset timing characteristics.

Referring now to the output voltage signal of the time delay integrator 47 at pin 8, it must reach 9.5 volts plus the voltage drop across the diode D20 (approximately equal to 0.6 volts) or a total of approximately 10.14 volts before the comparator of the trip voltage detector will change its output voltage level from its +13.5 volts to a −15 volts. Also, from analyzing the integrator's operation and its trip signal output voltage, one can determine what percentage of MFLC is necessary to cause a trip condition. Roughly speaking, this motor current which will cause a trip out of the overload relay is approximately 107% of the current setting of the feedback resistor network of the scaling amplifier. From this, a calculation of the trip times as a certain percent of MFLC can be made, and the following table is the result:

| Percent MFLC | T (seconds) |
| --- | --- |
| 100% | infinity |
| 115% | 122 |
| 150% | 66 |
| 200% | 42 |
| 300% | 24 |
| 400% | 17 |
| 500% | 14 |
| 600% | 11 |

Next, the description and operation of underload and single phase circuits 88 and 90, respectively, integrally functioning with the overload as previously mentioned will be detailed.

First of all, resistors R22 and R23, connected in series between the negative regulated voltage supply and common, and joined together at a node 84 are connected from node 84 to a node 86 at a positive input at pin 10 of one-fourth of a quad operational amplifier OP2 having a feedback resistor R25 connected from its output at pin 8 to its input at pin 10. Components R22, R23, R25 and one-fourth of quad op-amp OP2 comprise an enable latch circuit. The purpose of the enable latch circuit is to enable both the underload circuitry 88 and the single phase detection circuitry 90 during a 6×115%×MFLC start-up.

Initially, with no current signals present at each input of the current transformer CT1, CT2 and CT3 (one per phase for a three phase motor), pin 9 at the negative input of OP2 connected to the underload circuitry via node 48 will be biased at zero volts which is more positive than the negative reference set by voltage divider R22, R23 and a feedback resistor R25 connected between output pin 8 and input pin 10. This causes the output at pin 8 to switch to a negative 15 volts. This latches the negative reference voltage level at pin 10 to the equivalent of 148.9% to 151.2%×MFLC, depending upon resistor value tolerances. In other words, the enable latch circuit senses approximately 150%×MFLC at pin 9 to cause a change in the state of the output which then enables the underload and single phase circuits 88 and 90.

The −15 volt output at pin 8 of OP2 is fed through nodes 92, 94 and series resistor R51 to a negative input at pin 13 of quad op-amp OP2. A positive input at pin 12 of OP2 is connected to common. The output signal of OP2 at pin 14 is connected to a node 96 which provides a feedback path through resistor R50 to the negative input at pin 13. The output voltage at pin 14 of OP2 is approximately +13.5 volts. Input resistor R51 connected to pin 13 and feedback resistor R50 and one-fourth of quad op-amp OP2 make-up an inverting amplifier with a unity one gain. With +13.5 volts at pin 14 of OP2, a positive variable reference voltage passes through node 96, resistor R52 and potentiometer RH3 to a pin 2 of a negative input of one-fourth of the quad op-amp OP3. Positive variable reference voltage is established by a resistor divider network including the resistor R52, potentiometer RH3 connected in series thereto and a resistor R53 connected to potentiometer RH3 on one side and tied to common on the other side.

Since initiation of the solid state overload relay circuit, the overload portion of the circuit at node 52 is essentially at zero volts, and zero volts will be present at a pin 3 of a positive input of OP3. Thus, pin 2 is more positive than pin 3 and the output voltage at pin 1 of OP3 will be switched to a −15 volts. With the output signal at pin 1 of OP3 at a −15 volts, this insures that diode D22 in series with an output of resistor R32 is reversed biased acting essentially as an open circuit. A node 98 is connected between the resistor R32 and the diode D22, and the node is connected to minus regulated voltage supply through a capacitor C11. Therefore, the underload feature at start-up of the solid state overload relay is disabled.

Moreover, pin 3 connected to a positive input of quad op-amp OP2 in the single phase detection circuit 90 is connected to node 40 of the underload circuitry through a node 100, resistor R19, node 106 and node 108. At start-up of the motor, node 40 is at zero volts due to the offset adjustment network, including potentiometer RH4, resistor R17, resistor R18 connected to pin 3 of the positive input of the op-amp OP1 which compensates for any variances of the circuitry inputting to pin 2 of the negative input of OP1, so that the output voltage at pin 1 of OP1 is zero. Thus, with a zero voltage at pin 3 of OP2, its output at pin 1 thereof will also be zero volts.

A resistor divider network established by resistance R54 and a resistor R60 (minus the forward voltage drop of a diode D19 of approximately 0.5 volts) provides a +6.5 volts to a pin 13 at start-up of the motor, the negative input of another one-fourth of the quad op-amp OP3. A pin 12 at the positive input of one-fourth quad op-amp OP3 will be at approximately zero volts, since this is also connected to node 40 through node 100. Because pin 13 is much more positive than pin 12, the output voltage of OP3 at a pin 14 will switch to a −15 volts reverse biasing a diode D28 connected to its output. Reverse biased diode D28 is, for all practical purposes, an open circuit causing a diode D21 to be pulled down to a −15 volts and reverse biased through a resistor R48 connected between a node 102 and the minus regulated voltage supply. Therefore, the single phase detection circuit 90 is also disabled at the start-up.

Referring now to the operation of the underload, it is clear that, when the motor is started, it will initially draw approximately 6×1.15×MFLC for at least a few cycles. Such a current draw is more than enough to trigger op-amp OP2 of the enable latch circuit 47 to have a +13.5 volts at its output pin 8. This is caused because the reference voltage level at pin 10 of op-amp OP2 is biased to 150%×MFLC and, when pin 9 of op-amp OP2 passes through the 150% level on its way to the starting peak of 6×1.15×MFLC, pin 9 becomes more negative than pin 10 causing OP2 to switch states and the output of pin 8 changes to +13.5 volts. When the output of OP2 at pin 8 changes to +13.5 volts, it resets the latch reference voltage level of pin 10 to approximately 5%×MFLC. In short, pin 8 of op-amp OP2 is prevented from changing its state again until the signal at pin 9 drops below 5%×MFLC. Likewise, with a +13.5 volts at pin 13 of op-amp OP2 (the inverting unity gain amplifier), the output at its pin 14 will switch to a −13.5 volts.

Next, the adjustable voltage divider network of resistor R52, potentiometer RH3 and resistor R53 permits the negative reference voltage at pin 2 of op-amp OP3 to be set anywhere from 10% to 90% of the MFLC in setting the underload protection level. Typically, if the underload protection is not desired; the underload adjustment RH3 is set to 10% of MFLC. Now, op-amp OP3 at its output pin 1 will only change state when it senses the motor unloading (underload) in the current range settings of 10% to 90% of MFLC, as previously established by the adjustment to potentiometer RH3. As the motor becomes unloaded, the voltage at pin 3 will become more positive until it is equal to or greater than the reference voltage at pin 2 causing pin 1 to switch to a +13.5 volts. Capacitor C11 will then charge from a −15 volts through resistor R32 to a trip voltage of approximately 10 volts. The diode D22 is now forward biased; the 10 volts will be passed to node 104 and then to node 58 and to the negative input at pin 6 of op-amp OP3 resulting in the operation of the two level comparator which will switch states from a +13.5 volts to −15 volts disabling the control relay and opening the overload contacts. So, the overload relay CR1 will cause the contacts to drop out and the motor will become de-energized when this underload condition is sensed. When the motor drops out, the current goes to zero and pin 8 of op-amp OP2 switches back to a −15 volts, once again disabling both underload and the single phase detection circuits 88 and 90, as previously described. The underload, as well as overload circuits, now are de-energized until capacitor C14 from the time delay integrator circuit decays sufficiently to allow the resetting of the solid state overload relay protective apparatus for another start-up operation.

Referring now to the single phase detection operation, once again, if the motor is started, the motor can draw approximately 6×1.15×MFLC for at least a few cycles which is more than enough to trigger the output at pin 8 of the op-amp OP2 of the enable latch circuit to a +13.5 volts, resetting the latch reference voltage level at pin 10 to approximately 5%×MFLC. The output pin 14 of op-amp OP3 switches to a −13.5 volts with a +13.5 volts at its negative input at pin 13. Resistor R19 connected between the node 100 and the node 106, a capacitor C22 connected between node 106 and common, and a resistor R26 connected between the node 108 and common, divide the balance three phase signal from pin 1 of op-amp OP1 by one quarter to filter the signal so that it essentially resembles a DC reference level which tracks and is proportional to the input current signals. The feedback resistor R20 is connected between a node 110 and via resistor R21 to common; node 110 connects to pin 2 at the negative input of the op-amp OP2. The output at pin 1 of op-amp OP2 is connected to a node 112. The feedback resistor R20 is connected between node 112 and the node 110. R20, R21 and one-fourth of the quad op-amp OP2 make up a non-inverting amplifier with a gain of approximately two. The DC reference level signal established by resistor R19, capacitor C22 and resistor R26 is used as the input to the non-inverting at pin 3 of the amplifier, and, therefore, the output at pin 1 of op-amp OP2 is essentially a DC level voltage, which is always twice the magnitude of the level at pin 3 of OP2 and proportional to the three phase current signals. When pin 14 of op-amp OP2 in the underload circuit is at −13.5 volts, pin 1 of op-amp OP2 in the single phase circuit is more positive and, therefore, diode D19 is reverse biased enabling the single phase detection circuit 90.

As long as a balanced three phase signal is available (down to 5%×MFLC), pin 12 of op-amp OP3 will always be more negative (roughly, twice as negative as pin 13) and, therefore, pin 14 thereof will be at −15 volts. In this condition, the single phase detection circuit is disabled preventing the motor from being tripped out by a single phase trip signal. However, when a single phase condition occurs, the signal at pin 12 of op-amp OP3 drops to approximately zero volts in a periodic fashion for at least 18.5 degrees out of 360 degrees of each cycle. As the signal at pin 12 of op-amp OP3 approaches zero volts, as a result of a single phase condition, the voltage at pin 12 becomes more positive with respect to the signal at pin 13 (which does not change in this circumstance because the filtering effect of C22 is enough to hold up the signal during the time when one phase is lost) which causes the output of op-amp OP3 at pin 14 to switch to a +13.5 volts for 18.5 degrees and zero volts for the remainder of the cycle. The resulting train of positive pulses charges a capacitor C10 connected between a node 112 and the −15 volt supply. Capacitor C10 charges from a −15 volts to +10 volts (the trip voltage for comparator OP3) through a resistor R56 and provides a trip signal reference voltage through diode D21, node 58 to input pin 6 of op-amp OP3 of the trip voltage detector. After the motor trips out, the current once again goes to zero, resetting the enable latch, as described earlier herein.

A delay inhibit circuit 130 is also connected to the single phase circuit 90. This delay inhibit circuit 130 includes a lead input line 132 connected to node 94 at the output of pin 8 of op-amp OP2 at the enable latch circuit. Lead line 132 then connects to a capacitor C21 to a node 134 through a resistor R59 to a node 136 connected to the base of a driver Q9. A collector of the driver Q9 is connected to a resistor R57 then to a node 138 connecting it to the output of pin 14 of op-amp OP3 and to node 112 of C10. The emitter of the driver Q9 is connected via a node 140 to the −15 voltage supply. A diode D29 is connected across the base emitter circuit of Q9 and has its cathode connected to a node 136 and its anode connected to a node 142. A resistor R58 is connected between capacitor C21 and R59 at node 134 and to the −15 volt supply by a node 144. In operation, when the motor is started up, the output of OP2 at pin 8 changes from −15 volts to +13.5 volts, which is fed via input line 132 to the base of Q9 momentarily as defined by the RC time constant of C21 and R59. Positive input at the base Q9 turns on the driver circuit and discharges any voltage stored across capacitor C10. Then, after a short time, the base drive at Q9 changes to a negative value and Q9 turns off. The purpose for this circuit is so that, at start-up, C10 is fully discharged so that a spurious signal at start-up outputting at pin 14 of OP3 will not be sufficient to cause C10 to exceed the 10 volt trip level causing a nuisance tripping of the apparatus by outputting +10 volts to pin 6 of the two level comparator detection circuit OP3.

Figure 3:
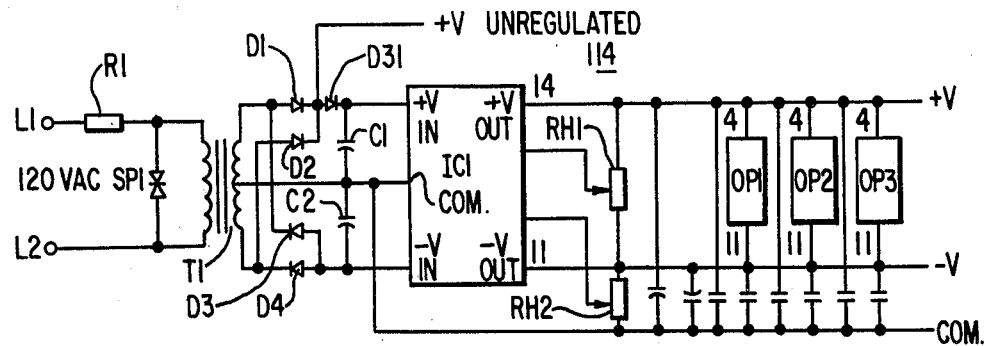
FIG. 3 shows the power supply circuitry of the present invention.

Turning now to FIG. 3, power supply 114 is shown which has an integrated chip, IC1, as its main control element. Its inputs L1 and L2 are connected to a 120-volt AC source. Line L1 includes a current limiting resistor R1 and a suppressor SP1 connected between line L1 and line L2. Transformer T1 provides an input to a fullwave rectified bridge including a center tap for the common. Capacitors C1 and C2 smooth out and level off the positive and negative voltage inputs into the chip IC1. A tap between diode D1 and D31 provides positive voltage unregulated which is fed to the positive voltage unregulated supply in FIG. 2 for supplying control relays CR1 and CR2 with power to operate the overload contacts and alarm contacts, respectively. The power supply 114 provides thermal protection and, if the supply collapses and shuts down, the only result is that the control relay CR1 in FIG. 2 becomes de-energized and drops out the overload contacts, thereby rendering the motor inoperative.

The power supply 114 is a tracking voltage regulator so that, if the positive supply goes, so does the negative supply to the same degree. Also shown are a balanced adjustment potentiometer RH1 and a control potentiometer RH2. Pins 4 and 11 connected to the quad op-amps OP1, OP2 and OP3 provide a positive voltage of 15 volts and a negative voltage of 15 volts, respectively.

Figure 4:
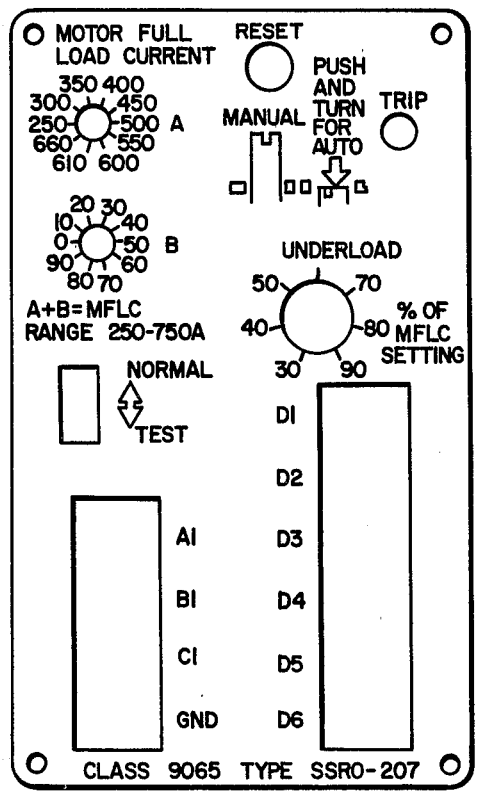
FIG. 4 shows a face plate from a housing incorporating the circuitry of FIG. 1.

Referring now to FIG. 4, the typical operation of the solid state overload relay protective apparatus begins by connecting terminals D1 and D2 to an AC input of 120 volts, 60 hertz, or 110-volt source at 50 hertz. Terminals D3 and D4 are connected to the overload contacts, and terminals D5 and D6 are connected to the alarm contacts. Terminals A1, B1 and C1 are connected to the output of the current transformers mounted on the starter and ground to the common of the power supply. The operator sets the controls by dialing switches A+B to equal the MFLC rating of the motor to be controlled. This range is from 250 amps to 750 amps which covers the full ranges of motors in the NEMA size 7 starter ratings. The reset button is adjusted to be in the normal operating position or it is pushed in and turned for an automatic reset mode. In either the case of manual or automatic, the op-amp OP3 output at pin 7 will not reset to +13.5 volts until capacitor C14 of the time integrator amplifier decays below the 1.2 volt level. Therefore, the reset time is the same whether in manual or automatic mode. Pushing the manual reset button in before capacitor C14 decays below the 1.2 volt value at pin 5 on op-amp OP3 at the trip level will not result in the resetting of the solid state overload relay circuitry.

The underload adjustment is set from 10% to 90% of the MFLC setting by adjusting potentiometer RH3, as shown in FIG. 4. After making all of the hook-ups for the solid state overload relay, as previously mentioned, the switch SW3 is moved from its normal position to a test position. The test position increases the open loop gain by switching in the large resistor R49 in series with feedback resistor network and op-amp OP1 saturates out at −13.5 volts on test so that at pin 1 there is a −13.5 volts causing the time integrator amplifier to provide an output to the trip reference voltage detector OP3 causing the output at pin 7 of the trip voltage detector to change to −15 volts and thereby removing the drive from the base of Q7 of the overload relay driver.

As described above, the solid state overload relay protective apparatus of this invention not only protects a motor against repeating overload, but also includes protection against an underload as well as a single phase condition. The fact that the signals from the overload circuit, underload circuit and single phase circuit are all fed to a common node inputting through the comparator of the trip voltage detector circuit provides a reliable OR gate logic in which a signal from any one of the three protection circuits will result in the overload contacts being opened and the motor tripped out. Moreover, by the use of the two level comparator OP3 in the trip voltage detector for both the trip and reset of the overload relay circuit, the same feedback capacitor C14 in the time delay integrating amplifier circuit of the overload detector is utilized for both the trip and reset timing characteristics.

Although in the foregoing embodiment the protective apparatus of this invention is applied to the protection of a three phase alternating current motor, it will be clearly understood that the invention is equally applicable to single phase as well as other types of alternating current motors.

We claim:

1. A solid state overload protective apparatus for an electric motor comprising:
    means for sensing the current flowing through each phase of said motor when energized and for generating a sensed output signal proportional in magnitude to the sensed current;
    means responsive to the sensed output signal of each phase for converting said sensed signal into a second signal also proportional in magnitude to the sensed current of the motor, said converting means reflecting an active short circuit back to said current sensing means thereby reducing the current handling requirements for said current sensing means;
    means for summing said second signals of each phase from the output of said converter means and for scaling said summed second signals to provide a third signal representative of a predetermined motor full load current carrying capacity of said motor, said scaling means having an adjustable control for setting the value representative of a predetermined motor full load current carrying capacity;
    means for integrating said third signal output of said summing and scaling means to provide a trip signal, said integrating means having a feedback capacitor connected from the output of said integrating means to one of its inputs;
    comparator means having one input tied to a predetermined trip reference voltage and another input connected to the output of said integrating means to receive said trip signal, said comparator means producing a drive output signal when said trip signal is a lesser magnitude than said trip reference signal, and said comparator producing a turn off signal indicative of an overload condition when said trip signal exceeds the magnitude of the trip reference signal; and,
    means responsive to said drive and turn off signals for continuing the supply of current to said motor when the drive signal is present and for interrupting the supply of current to said motor when the turn off signal is present, respectively.

2. The solid state overload protective apparatus of claim 1 further including an ideal diode peak detector means connected in series between the output of said summing and scaling means and the input of said integrating means for averaging the value of said third signal output from said summing and scaling means.

3. The solid state overload protective apparatus of claim 1 wherein said summing and scaling means includes an operational amplifier having a non-inverting input and an inverting input thereto and an output, said summing and scaling means further including an offset adjustment means connected to the non-inverting input to provide a zero voltage output when the sensed current is zero to compensate for the variances in the electrical circuit components connected to the inverting input of said operational amplifier.

4. The solid state overload protective apparatus of claim 3 wherein said full load current setting includes a feedback resistor switching network for setting motor full load current connected between the output of said operational amplifier and the inverting input, said switching network including a fixed resistance and a pair of BCD code switches connected in parallel thereto having various ohmic values so that the feedback resistor switching network will approximate motor full load current settings from 250 amps to 750 amps to cover a broad range of motors for a given size starter resulting in the third output signal of the operational amplifier being approximately the same magnitude for various motor full load current settings.

5. The solid state overload relay protective apparatus of claim 4 further including a switch connected from the output of the operational amplifier to one side of the fixed resistor being in the normally closed position, and a large ohmic value resistor connected in parallel thereto so that, when the switch is pushed to a test position opening the same, the opened loop gain achieved by switching in said large resistor saturates out the operational amplifier to approximately −15 volts causing a trip signal at said comparator means to de-energize the motor.

6. The solid state overload protective apparatus of claim 1 further including:
    means responsive to said third signal output from the summing and scaling means for detecting a predetermined underload condition which is a percent of the motor full load current setting to provide a trip signal when an underload condition is sensed, said underload detection means having an output connected to the same input of said comparator means as the output of said integrating means from the overload circuit.

7. The solid state overload protective apparatus of claim 6 wherein the underload means includes an adjustable setting to achieve a percent of motor full load current for a desired underload setting.

8. The solid state overload protective apparatus of claim 1 further including a single phase detection means having an input connected to the output of the summing and scaling means, a first operational amplifier having a non-inverting input connected to said input and a feedback loop from its output to its inverting input, a second operational amplifier having its inverting input connected to the output of said first operational amplifier and having its non-inverting input connected to said input from the summing and scaling means, and an output therefrom, a charging capacitor connected across said output from the second operational amplifier, a forward biased diode connected between the output of said second amplifier and the charging capacitor, and an output from said charging circuit to the input of the comparator means for providing a trip signal for tripping out the overload contacts when said charging capacitor provides an output trip signal greater than said trip reference voltage.

9. The solid state overload protective apparatus of claim 8 wherein the input to said first amplifier at normal motor full load current produces a negative output fed to the inverting input of said second amplifier and the output from said summing and scaling means provides an input to the non-inverting input having a more negative magnitude such that said amplifier is switched to a −15 volts to reverse biasing said diode during normal motor full load currents to provide a lack of charging current for said capacitor and during a sensed loss of phase condition, said second amplifier non-inverting input falling to approximately zero volts in a periodic fashion causing the output of said second amplifier to switch to a +13.5 volts for a short period, thus charging said capacitor from a −15 volts to +10 volts which then is fed to the comparator means for tripping out the motor.

10. The solid state overload protective apparatus of claim 9 further including an inhibit delay means for discharging said charging capacitor to approximately zero volts at the initial start-up of said electric motor.

11. The solid state overload protective apparatus of claim 1 further including a reset means having a switch positionable in either a manual mode or an automatic mode for resetting the comparator means to its initial state whereby another trip signal is required to actuate the comparator means once again to change its output state to a trip state.

12. The solid state overload protective apparatus of claim 1 wherein said trip means includes a control relay having a driver circuit de-energizing said relay when the comparator means changes from is first state to its second state with a trip signal and a second control relay and light emitting diode connected in parallel thereto having a driver circuit operating the same but which is energized when the first control relay driver circuit is de-energized with a trip signal.

13. A solid state overload protective apparatus for a three phase alternating current motor, comprising:
   a three phase current detection means for detecting the current flow through said motor when energized to produce a first output signal proportional in magnitude to the detected current in each phase, said detection means having a secondary circuit at its output for each of said first signals;
   an active load means connected to the output of said current detector means and responsive to said first signals which reflects a secondary short circuit back to said detector means, said active load means having a halfwave rectified output for each of said phases and operating as a current-to-voltage converter circuit;
   summing and scaling amplifier means connected to the output of said converter circuits having a variable feedback resistor switching network for setting a reference motor full load current equal to the motor full load current rating of said electric motor, said summing and scaling amplifier means having a scaled voltage output representative of a motor full load current;
   an ideal diode peak detector means responsive to the representative motor full load current scaled voltage for averaging said motor full load current scaled voltage to provide an average output voltage signal;
   a time integrator amplifier means responsive to said average voltage signal to provide inverse trip time characteristics, said integrating means having a feedback capacitor in the time delay integrator for determining trip and reset timing characteristics, said capacitor charging to a trip level to provide a trip output signal;
   a trip voltage detector means having one input connected to a predetermined trip reference voltage and a second input connected to the trip output voltage of said time integrating amplifier means for comparing the trip reference voltage to the trip signal and, when the trip signal magnitude is equal to or greater than the trip reference voltage indicative of an overload condition, said trip voltage detector means changes from a driving signal level to a turn off signal level at its output; and,
   an overload relay means having an overload relay, an overload relay driver circuit in series with said overload relay and connected to the output of said trip voltage detector means to energize said overload relay when the driving signal is present and de-energize said overload relay when a turn off signal is present.

14. The solid state overload relay protective apparatus of claim 13 further including reset means having a latching voltage connected to a second input of said trip voltage detector means and having a manually or automatically operated switch so that, when the switch is in a closed position, the latching voltage to said second input is shorted causing the trip voltage detector means to change from the trip state to the turn on state thereby energizing the driver circuit of the overload relay driver means as soon as the feedback capacitor of the integrating means decays below the value at said first input of the detector means.

15. The solid state overload relay protective apparatus of claim 13 further including an underload detector means having an adjustable percent of motor full load current setting to generate a trip signal as an output responsive to an underload condition sensed at its input connected to the output of the ideal diode peak detector means in the overload circuit.

16. The solid state overload relay protective apparatus of claim 13 further including a single phase detection means having a charging circuit for generating a trip signal connected to said second input of the trip voltage detection means whenever a single phase condition is sensed at its input connected to the output of the summing and scaling amplifier means.

17. The solid state overload relay protective apparatus of claim 16 further including a delay inhibit circuit connected to said single phase charging circuit for discharging said charging circuit at the start-up of said electric motor so that nuisance trip signals are not generated.

* * * * *